(12) United States Patent
James et al.

(10) Patent No.: US 7,136,886 B1
(45) Date of Patent: Nov. 14, 2006

(54) PRE-MASTERING FOR OPTICAL MEDIA RECORDING

(75) Inventors: Kenneth James, Pleasanton, CA (US); Luke Kein La, Santa Clara, CA (US)

(73) Assignee: Sonic Solutions, Santa Clara, CA (US)

( * ) Notice: Subject to any disclaimer, the term of this patent is extended or adjusted under 35 U.S.C. 154(b) by 492 days.

(21) Appl. No.: 10/352,697

(22) Filed: Jan. 27, 2003

(51) Int. Cl.
G06F 17/30 (2006.01)

(52) U.S. Cl. ..................................... 707/205; 707/101

(58) Field of Classification Search .................... 707/1, 707/2, 3, 4, 5, 6, 7, 8, 9, 10, 100, 101, 102, 707/104.1; 709/328; 710/74
See application file for complete search history.

(56) References Cited

U.S. PATENT DOCUMENTS

| | | | | |
|---|---|---|---|---|
| 5,280,468 | A | * | 1/1994 | Nakajima et al. ........ 369/275.1 |
| 5,394,382 | A | * | 2/1995 | Hu et al. ................. 369/30.19 |
| 6,088,747 | A | * | 7/2000 | Cotugno et al. .............. 710/74 |
| 6,226,241 | B1 | * | 5/2001 | D'Amato et al. ........ 369/47.15 |
| 6,885,624 | B1 | * | 4/2005 | La et al. ..................... 369/59.1 |
| 6,910,038 | B1 | * | 6/2005 | James ............................ 707/7 |
| 2003/0182471 | A1 | * | 9/2003 | Harris et al. ................ 709/328 |

* cited by examiner

Primary Examiner—Jeffrey Gaffin
Assistant Examiner—Yicun Wu
(74) Attorney, Agent, or Firm—Martine, Penilla & Gencarella, LLP (57) ABSTRACT

Methods and media for pre-mastering in preparation for recording data files to optical media are provided. In one example, a method for pre-mastering includes receiving a selection of data files to be recorded to an optical media and generating a database in which to list the selection. The database is populated with the selection of data files which are identified by file node and listed in alphabetical order by directory. The method provides for accessing a file in the database, verifying a source location of the accessed file, verifying an integrity of the accessed file, and determining a destination location for the accessed file. The determining of the destination location includes determining a logical block to which at least a portion of the accessed file is to be recorded on the optical media.

20 Claims, 6 Drawing Sheets

PRE-MASTERING FOR OPTICAL MEDIA RECORDING

BACKGROUND OF THE INVENTION

1. Field of the Invention

The present invention relates generally to the recording of data to optical media, and more particularly to a method for determining the target layout and which files to cache during the pre-mastering stage of optical media recording.

2. Description of the Related Art

When recording data to optical media, a user typically selects a plurality of files from a source or plurality of sources, identifies a target or destination optical media, and executes a recording function. The selected files can be of any type including audio files, video files, photographic files, data files, and the like. The recording function is typically executed by use of an optical media recording program which accomplishes such tasks as mapping out precise locations of source files, determining size of source files, mapping out a precise target destination for the selected files, calculating a theoretical transfer rate for reading the file from a source and recording the file to a destination, identifying those files that will be cached and those files that will be recorded directly from source to destination, performing necessary formatting as required, and burning the selected files to a destination optical media. Data can be recorded in one or more sessions to a single optical media.

During the pre-mastering stage in preparation for recording data files to optical media, selected files are typically sorted a plurality of times to achieve an optimum recording order that avoids buffer under-run, and that minimizes recording time when the actual burn operation is accomplished. The plurality of file sorts is usually intended to maximize efficient use of available resources by establishing a writing order that matches system resources and specifications such as transfer rate, buffer size, read speed for source location, target optical media device write speed, available system cache, and the like.

While the plurality of file sorts remains a viable and efficient use of system resources for a user wishing to record a relatively small or limited number of data files to optical media, as the number of files selected for recording increases, the system processing time required to accomplish the plurality of sorts for an increasing number of files, as well as for an increasing number of file sorts as a result of the increasing number of files, increases significantly. A large number of files, e.g., 20,000–50,000 files, depending on size, can take up to four minutes of processing time, plus an additional approximately five minutes to perform a system test used to calculate an average file transfer rate. For users recording large numbers of data files, it is desirable that the processing time prior to recording be minimized, as should the recording time to record the selected files.

As is known, when files are recorded to optical media, the files are read from a source location, from a plurality of source locations, or a system cache into a buffer of a recording device. A file system for the destination optical media is created, and the files are then written to the destination or target optical media from the optical media recording device buffer, along with required file system and other data structures in order to comply with accepted data formats and specifications. In typical prior art programs, the filling and depletion of the buffer, file size, optical media device read and write speeds, and other factors were all considered during the plurality of file sorts to maximize efficient utilization of system resources and avoid buffer under-run. Typical optical media recording devices now have sufficient buffer under-run protection resident in the recording device to make much of the plurality of file sorts unnecessary.

In view of the foregoing, what is needed is a method of recording data to optical media that avoids excessive consumption of system processing time, and maximizes efficient use of available recording resources while avoiding the problems of the prior art.

SUMMARY OF THE INVENTION

Broadly speaking, the present invention fills these needs by providing a method for pre-mastering in preparation for writing data files to optical media in which selected files are arranged and recorded to optical media in alphabetical order. The present invention can be implemented in numerous ways, including as a process, an apparatus, a system, a device, a method, or a computer readable media. Several embodiments of the present invention are described below.

In one embodiment, a method for recording data files to optical media is disclosed. The method includes receiving a request to write a selection of data files to an optical media and generating a file node for each file in the selection of data files. A database for the selection of data files is constructed, and the database is configured to list each file in the selection of data files to be written to the optical media. The method further includes writing the selection of data files listed in the database to the optical media. The selection of data files listed in the database is arranged in alphabetical order by directory and listed by file node.

In another embodiment, a method for pre-mastering in preparation for recording data files to optical media is disclosed. The method includes receiving a selection of data files to be recorded to an optical media, and generating a database in which to list the selection of data files. The database is populated with the selection of data files which are identified by file node and listed in alphabetical order by directory. The method further includes accessing a file in the database, verifying a source location of the accessed file, verifying an integrity of the accessed file, and determining a destination location of the accessed file. The determining of the destination location of the accessed file includes determining a logical block to which at least a portion of the accessed file is to be recorded on the optical media.

In still a further embodiment, computer readable media having program instructions for recording data files to optical media is disclosed. The computer readable media includes program instructions for receiving a selection of data files to be recorded to optical media, and for populating a database with a file node for each file in the selection of data files. The database is populated with the selection of data files sequenced in alphabetical order by directory. Further provided are program instructions for accessing each file in the database, and for verifying each file in the database. The computer readable media further includes program instructions for performing a caching algorithm to evaluate each file in the selection of data files. Program instructions are provided to determine a location on the optical media where each file in the selection of data files shall be recorded, and for recording the selection of data files to the optical media.

The advantages of the present invention are numerous. One notable benefit and advantage of the invention is the recording of large quantities of data files to optical media is accomplished so that repeated sorting of files during pre-mastering is eliminated. The resources required for pre-mastering is greatly reduced, as is the time required for pre-mastering in preparation for recording selected files to optical media.

Another benefit is the present invention results in optical media that are easier to access and to use after recording since data files recorded thereon are generally sequenced in the same manner in which files are sequenced or arranged or organized on the local drive or by the resident operating system.

An additional benefit is that embodiments of the present invention provide for both user interaction and control, if desired, as well as minimal user interaction and control of the pre-mastering process enabling a range of users from the average consumer to the technically experienced to pre-master and record to destination optical media according to desire and ability.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for recording data files to optical media, and for pre-mastering in preparation for recording, is disclosed. In preferred embodiments, methods include the arranging of data files selected for recording to optical media alphabetically by directory, and enabling the editing of assigned tracks as well as the fixing of locations within the sequence of selected files. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Typically, when writing or recording data files to optical media (e.g., CD-R/RW, DVD-R/RW, DVD+RW, etc.), one or more source files is selected for recording, and a burn or record request is executed. The selection of files can be accomplished in any number of ways including, for example, operator input into the system through the graphical user interface (e.g., dragging one or more files to an optical media device icon on a computer monitor), or executing an optical media read/write software application, and in response to a scripted set of queries, the operator selecting one or more files to be written to a target optical media. Further, the one or more source files can be located at one or more source locations. Typical source locations for files include, hard drives, peripheral drives, network locations, intranet locations, internet locations, and the like.

In preparation for recording to optical media, a database is called, constructed, or otherwise generated. The generation of a database includes mapping out source locations of each selected file, and listing of the source file by file node in a sequential list of files to be recorded. Subsequent operations, as described in greater detail below, include source file verification, destination file mapping, determining which source files to send to system cache and which to read directly into a buffer during recording, and a plurality of file processing operations in preparation for recording, also known as burning, selected files to optical media. Typically, files are added to the database as they are selected for recording, initially processed in the order in which the files were added to the database, and then sorted, and re-sorted in the determination of an optimum writing order to maximize efficient use of system resources, minimize recording time, and minimize the likelihood of buffer under-run.

Figure 1:
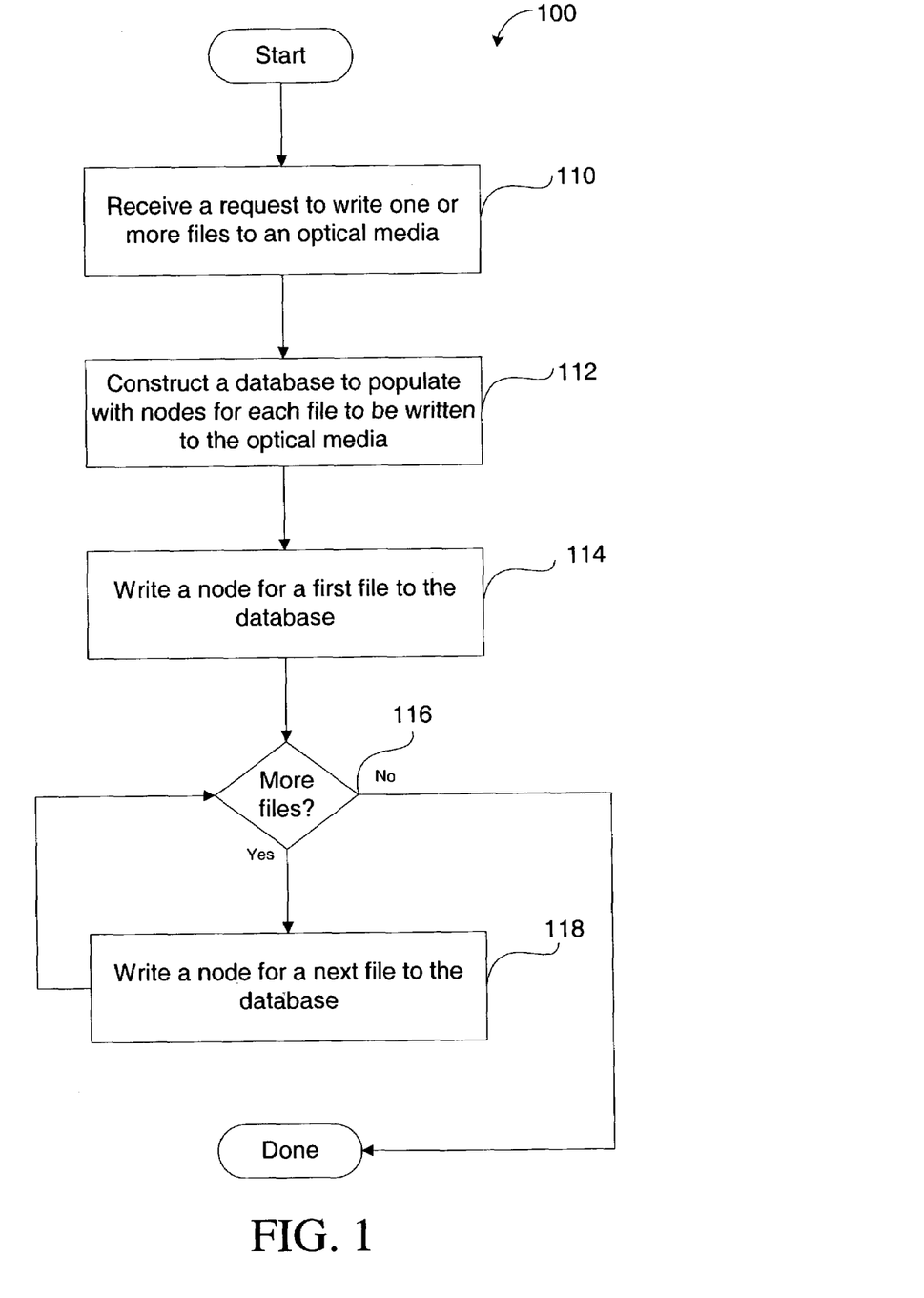
FIG. 1 is a flow chart diagram illustrating method operations performed in writing data files to optical media in accordance with one embodiment of the present invention.

FIG. 1 is a flow chart diagram 100 illustrating method operations performed in writing data files to optical media in accordance with one embodiment of the present invention. The method begins with operation 110 in which a request is received to write one or more files to an optical media. In one embodiment, the request is received in response to the execution of an optical media recording program and associated queries. In another embodiment, the request is received when a user drags one or more files to an icon associated with an optical media, an optical media recording device, and the like on a computer desktop in a computer operating system environment. In other embodiments, the request is received in any manner in which files are selected to be recorded to an optical media and a request or command to record is executed.

The method continues with operation 112 in which a database is constructed to be populated with nodes for each file selected to be written to the optical media. In one embodiment, the database is a file or file structure used to receive, hold, and present a sequential list of files to be recorded to optical media, and any other such identifying information about each file as necessary or desired. In one embodiment, the database includes for each file, for example, the source file name, source location, the size of the file, the type of file, and other such identifying data. Each file selected to be recorded to optical media will have a corresponding entry in the database.

In one embodiment, the source location for each file selected to be written or recorded to optical media is identified by file node. As described in co-pending U.S. patent application Ser. No. 10/224,686, entitled METHODS FOR RECORDING DATA TO OPTICAL MEDIA, filed on 20 Aug. 2002, and assigned to the same assignee as the present invention, the disclosure of which is hereby incorporated by reference in its entirety, file nodes, also known as file path nodes, are used to identify and call or retrieve files in a single step from root to file through any intermediate directories, subdirectories, and the like. The single step avoids the tracing of files back through any intermediate sub-directories, directories, and the like, and minimizes processing time and resource utilization when a file is called. In an embodiment of the present invention, the database populated with the files selected for recording to optical media identifies each file by node.

Returning to FIG. 1, the method continues with operation 114 in which a node for the first file selected to be written to optical media is written to the database. In accordance with one embodiment of the invention, the database is populated in a same manner in which the host operating system reads files. By way of example, Microsoft® Windows® operating systems read and process files alphabetically by directory. The embodiment described is sequenced in the same manner in which an exemplary operating system reads and processes files. Other operating systems commonly follow the same or a similar schema. Typically, nodes representing files are written to the database so that they are generally arranged or sequenced alphabetically by directory. The highest level directories, e.g., those directories closest to the root of the source, are arranged alphabetically, followed by any files at the same structural or hierarchical level as the directories, also arranged alphabetically. Files within directories are alphabetized, and any sub-directories are arranged alphabetically as are their contents, etc. As is typical for alphabetical sequencing, numbers are included in the priority scheme, and so the sequencing is alpha-numeric. As used herein, alphabetical sequencing includes alpha-numeric sequencing.

The method continues with decision block 116 in which it is determined whether more nodes corresponding to data files selected for writing to optical media remain to be written to the database. Decision block 116 ensures that all files selected to be written to optical media have corresponding nodes entered in the data base. If more files remain, a "yes" to decision block 116, the method proceeds with operation 118 in which a node is written corresponding to a next selected file. The method then loops back to decision block 116 until all selected files have corresponding nodes written to the data base. When no additional files remain, a "no" to decision block 116, the method is done.

As illustrated in FIG. 1, one embodiment of the present invention includes populating a database with nodes corresponding to each file selected to be written to a target optical media. In one embodiment, the writing of nodes corresponding to the selected files preserves the structure of the files as selected. By way of example, if an entire directory (or sub-directory, etc.) is selected for writing to optical media, the node written corresponds to the parent directory of each of the selected files, with each selected file identified as located in the parent directory. When the selected files are written to the optical media, the parent directory is written and populated with each of the selected files, thereby preserving the source structure for entire directories. Further, if the entire directory is selected for writing to the target optical media, any sub-directories of the selected directory would be selected and written to the target optical media within the same structure as the selected directory. One embodiment of the invention provides a query, option, or other manner of selecting whether to include sub-directories with any selected directory. In another embodiment, only selected files are written to the optical media, and any structure, including directories, sub-directories, and the like, must be created on the target optical media.

In one embodiment of the invention, the database is used to perform a number of file processing, pre-mastering operations in preparation for writing the selected files to a target optical media. Such file processing functions include, but are not limited to, mapping out source locations of each of the selected files and sequentially listing each of the corresponding nodes as described above, determining which files will be sent to system cache during the recording operation, generating pointers and data structures which are passed to the recording engine, mapping out destination locations, and other file processing operations, also known as pre-mastering operations, in preparation for the writing, also known as recording or burning, of the selected data files to a target optical media.

In processing the selected data files to be recorded to the target optical media, several discrete operations are performed as will be discussed in greater detail below. In accordance with embodiments of the present invention, these processing operations are accomplished in a single pass of the files, in the sequence as listed in the database. In one embodiment, the processing includes examining each of the selected data files and verifying the source location of the file, the file size, the integrity of the file, and other file attributes to enable the writing of the source data file to a destination optical media. In order to verify the source file, and in order to enable the recording engine to locate and read the selected file, the corresponding node is written to the database as described above in reference to FIG. 1.

Figure 2:
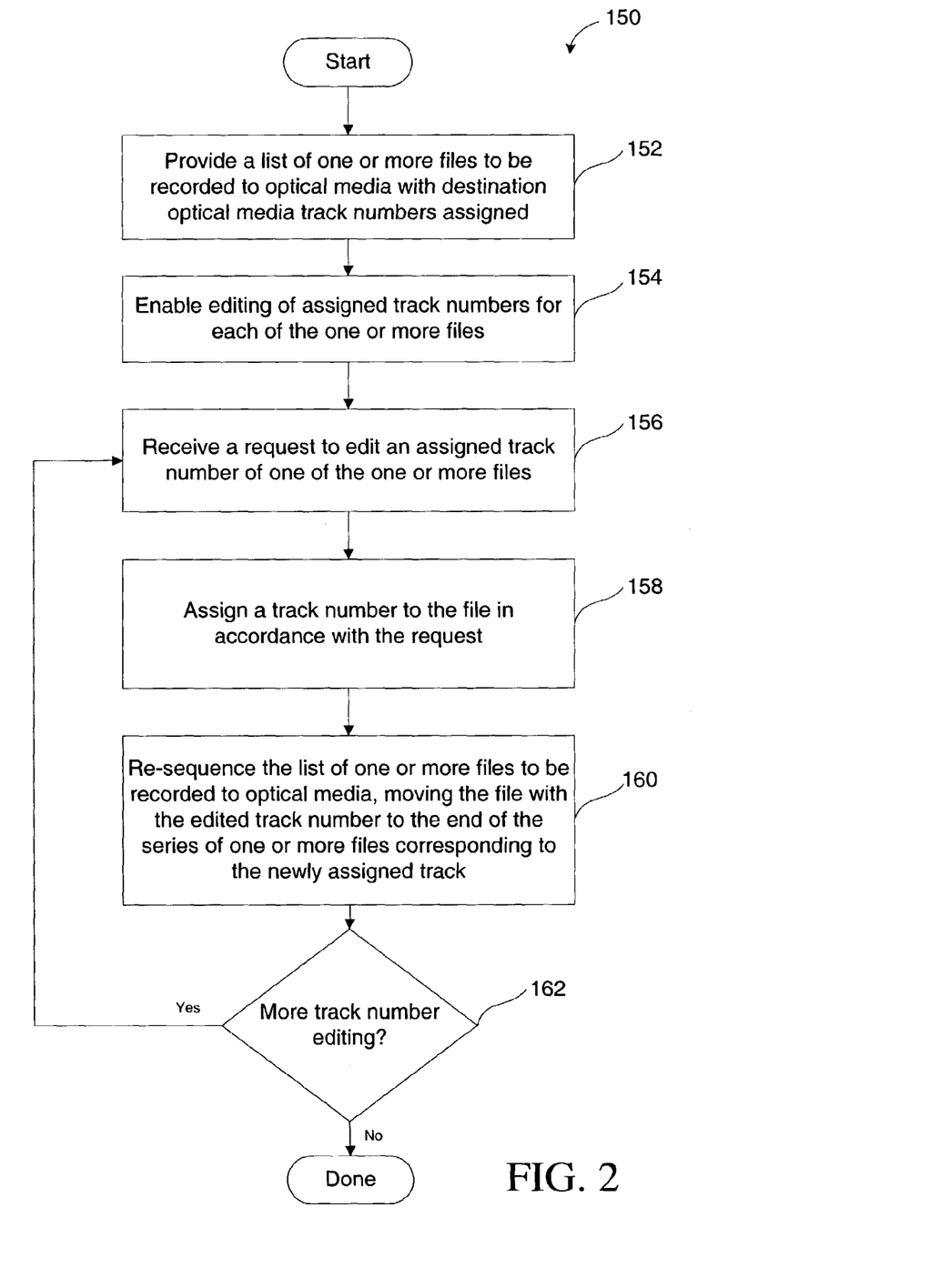
FIG. 2 is a flow chart diagram illustrating method operations performed in pre-mastering processing in accordance with one embodiment of the present invention.

FIG. 2 is a flow chart diagram 150 illustrating method operations performed in pre-mastering processing in accordance with one embodiment of the present invention. In preparation for writing selected files to optical media, file processing includes the determining of a location on the target optical media. The determining of a location includes assigning each selected file to a track and block or sector number. Typically, such assignment is performed automatically in accordance with the kind and type of target optical media, the kind and type of source files, the amount of media space required and available, formatting specifications and conventions, and other such criteria, standards, and the like that usually require or accept little or no user input. In accordance with one embodiment of the invention, the database lists the selected files for recording to optical media in the sequential order as described above which is typically in alphabetical order by directory. In one embodiment, the database can further list the selected files with the assigned track on the target optical media, and further enable editing of the assigned track.

Turning now to FIG. 2, the method begins with operation 152 in which a list of one or more files selected for writing to optical media is provided, and in which the assigned track on the destination optical media is indicated. In one embodiment, the list is the database as described above. The database, as described above, provides the nodes corresponding to the selected files in the order in which the files will be written to the destination optical media. In one embodiment, a plurality of options are enabled to provide a selection to a user to view particular characteristics of each selected file, including assigned track numbers. In other embodiments, viewing options may include file size in blocks, file size in bytes, file source locations and characteristics (e.g., removable media, network, internet, and the like), and any other desired file attribute, characteristic, and the like.

The method continues with operation 154 in which editing of assigned track numbers for each of the one or more selected files is enabled. In embodiments of the present invention, enabling of the editing of track numbers is accomplished in such manners as providing an edit function that a user may select, simply displaying the database with track numbers, providing a prompt or query during the processing of files in preparation for writing to optical media, or any other manner of enabling the editing of assigned track numbers.

Next, the method proceeds with operation 156 in which a request to edit an assigned track number of one of the one or more selected files is received. As described above in reference to operation 154, embodiments of the present invention enable track number editing by providing prompts, queries, editing menus, functions, and the like, and the receiving of the request is, in various embodiments of the invention, in response to or by selection of any of the prompts, queries, menus, functions, and the like.

The method continues with operation 158 in which a track number is assigned to the file as requested. In one embodiment, the response to the request to assign a particular track number to a file is the assigning of the requested track number.

Next, in operation 160, the list of the one or more files to be recorded to optical media and associated assigned track numbers is re-sequenced in accordance with the newly assigned track number. In one embodiment, the file (represented on the list as a node) with the newly assigned or edited track number is moved to the end of the series of one or more files assigned to the same track. In one embodiment, an exception to the sequencing of files alphabetically by directory occurs when a file is assigned to a track in accordance with enabled assigned track number editing. The file having a newly assigned track number is moved to the end of the sequence of any files assigned to the track. In another embodiment, all files assigned to a track are re-sequenced to be in alphabetical order within the track.

The method continues with decision block 162 in which it is determined whether more track number editing is desired. Decision block 162 sets up a loop in order to process all files for which track number editing is desired. As long as files remain for which track number editing is desired, a "yes" to decision block 162, the method loops back to operation 156 in which a request is received to edit an assigned track number of one of the one or more files. The method proceeds as already described until no further track number editing is desired, a "no" to decision block 162, and the method is done.

Figures 3A, 3B:
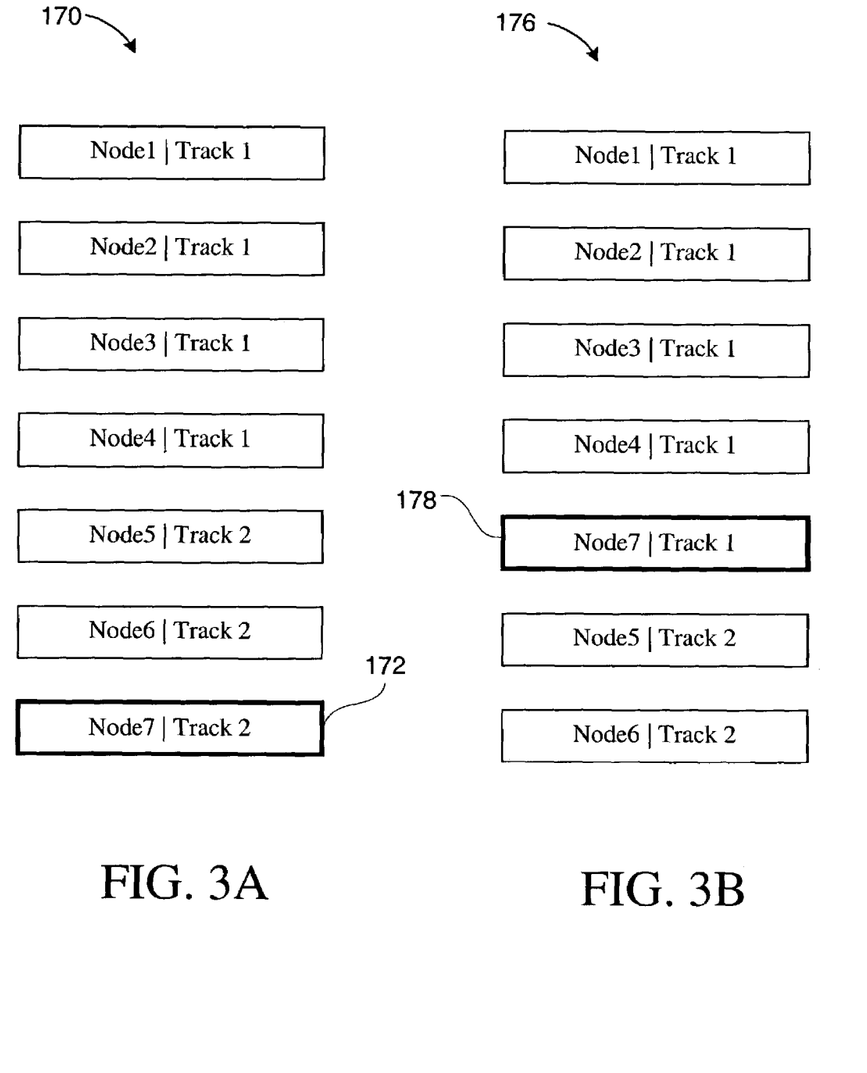
FIG. 3A illustrates a partial database list in accordance with one embodiment of the present invention.
FIG. 3B illustrates the re-sequenced partial database list in accordance with an embodiment of the invention.

An embodiment of the present invention in which track number editing is enabled is further illustrated in FIGS. 3A and 3B. FIG. 3A illustrates a partial database list 170 in accordance with one embodiment of the present invention. The partial database list 170 identifies files by node, illustrated for simplicity as nodes 1 through 7, with assigned track number indicated. The file 172 identified at node 7 has been assigned to track number 2. In accordance with one embodiment of the invention, the file 172 is selected for track number editing. In the example of FIGS. 3A and 3B, the track number is to be edited to be re-assigned to track 1. With track number editing enabled as described above, the request to change the track number to track number 1 is entered as described above in reference to FIG. 2.

FIG. 3B illustrates the re-sequenced partial database list 176 in accordance with an embodiment of the invention. The request to change the track number for the file 172 entered in FIG. 3A has been received and effected. The re-sequenced file 178 in FIG. 3B shows the re-sequenced file 178 identified at node 7 has been re-assigned to track 1. When the track number is re-assigned, the re-sequenced file 178 is moved to the end of the series of files already assigned to track 1. In FIG. 3B, the re-sequenced file 178 identified at node 7 was moved to follow the last file assigned to the series of files assigned to track 1, regardless of where it may have otherwise been alphabetically sequenced.

Figure 4:
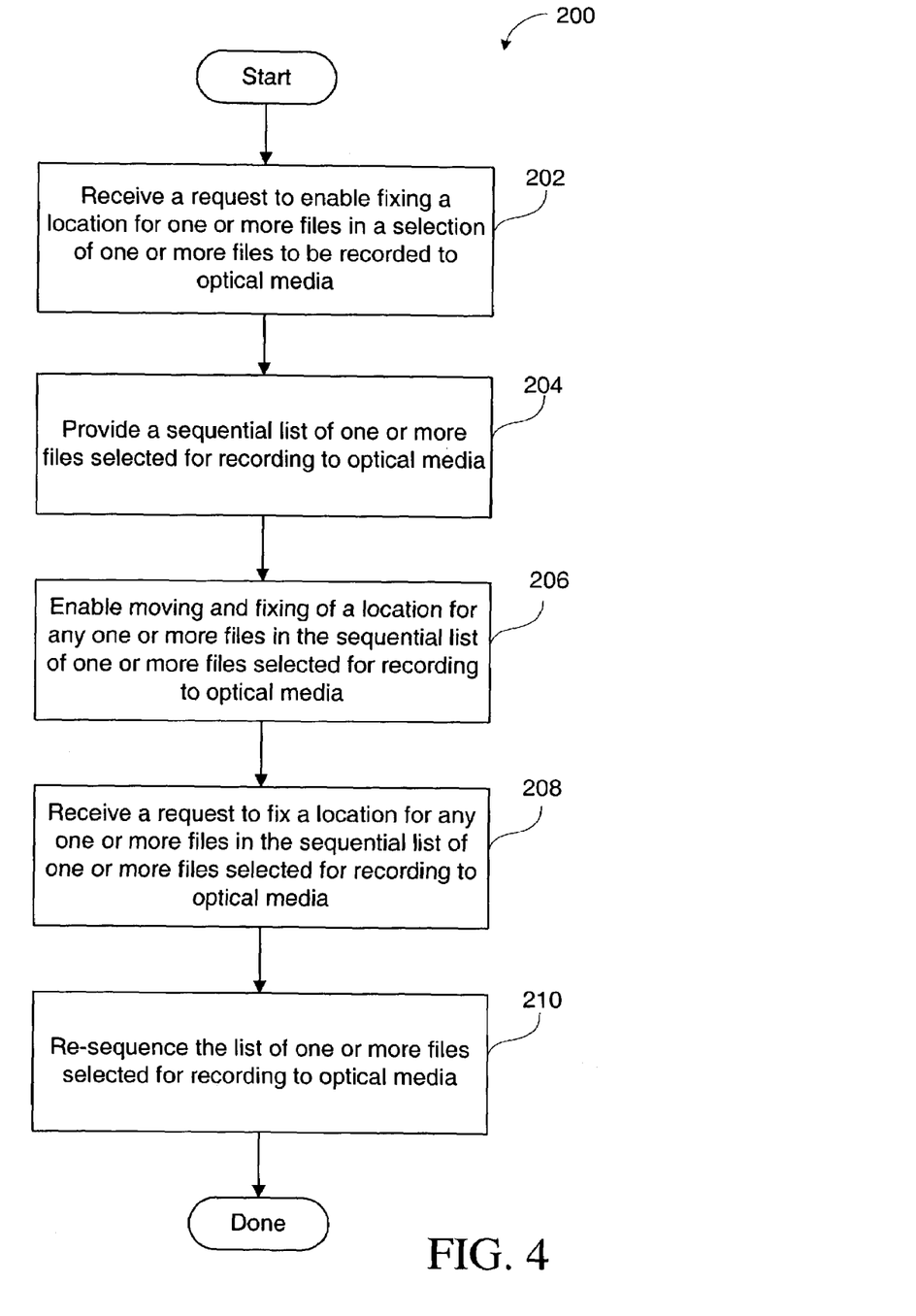
FIG. 4 is a flow chart diagram illustrating method operations performed in pre-mastering processing in accordance with one embodiment of the present invention.

FIG. 4 is a flow chart diagram 200 illustrating method operations performed in pre-mastering processing in accordance with one embodiment of the present invention. The pre-mastering processing illustrated in FIG. 4 includes the ability to fix a location of one or more files to be written to optical media as desired. The method begins with operation 202 in which a request is received to fix a location for a file in a selection of one or more files to be recorded to optical media. In one embodiment, the database lists the selection of one or more files to be recorded to optical media in the order or sequence in which the one or more files are to be recorded to the destination optical media. The list of files may include additional information such as file size, assigned track, and the like. Additionally, files assigned to a fixed location, or fixed by a user to a specific location, may also be indicated. In operation 202, a user typically executes a function, selects an option, or other common method of function selection to request fixing a particular location for one or more of the files selected to be recorded to optical media. The request to fix a location for a file in operation 202 is also known as a request to enable the moving and fixing of files in the sequential list of one or more files selected for recording to optical media.

The method continues with operation 204 in which a sequential list of one or more files selected for recording to optical media is provided. As described above, a sequential list of one or more files may contain any of a plurality of file characteristics, qualities, or other additional information as desired. In one embodiment of the invention, the sequential list of one or more files indicates an assigned sequential order for the one or more files on the destination optical media. Further, any file fixed in location by default or by user request is indicated as being fixed.

Next, in operation 206, the method enables moving and fixing of a location for any one or more files in the sequential list of one or more files selected for recording to optical media. In one embodiment, the enabling is signified by providing an alert, an option, a query, a prompt, or other such manner of advising a user that position fixing is enabled.

The method continues with operation 208 in which a request to fix a location for any one or more files in the sequential list of one or more files selected for recording to optical media is received. Typically, a user makes a selection, answers a query, drags and drops a file, or other such method of transmitting a request to fix a location of one or more files. In operation 208, the request is received. In one embodiment, only one file at a time may be moved and fixed. In another embodiment, moving and fixing is enabled for the entire sequential list, and when the desired sequence is set, the request encompasses any and all file sequencing desired and selected.

The method concludes with operation 210 in which the list of one or more files selected for recording to optical media is re-sequenced in accordance with the request received in operation 208. In one embodiment, the request to fix the location of one or more files can encompass as many or as few files as desired to fix a desired sequence. In other embodiments, requests can be submitted to fix a single file in a desired location, and requests repeatedly submitted for as many files for which it is desired to fix the location. In one embodiment of the invention, files fixed in a particular location are indicated to be fixed. When the list is re-sequenced in operation 210, the method is done.

Figure 5A:
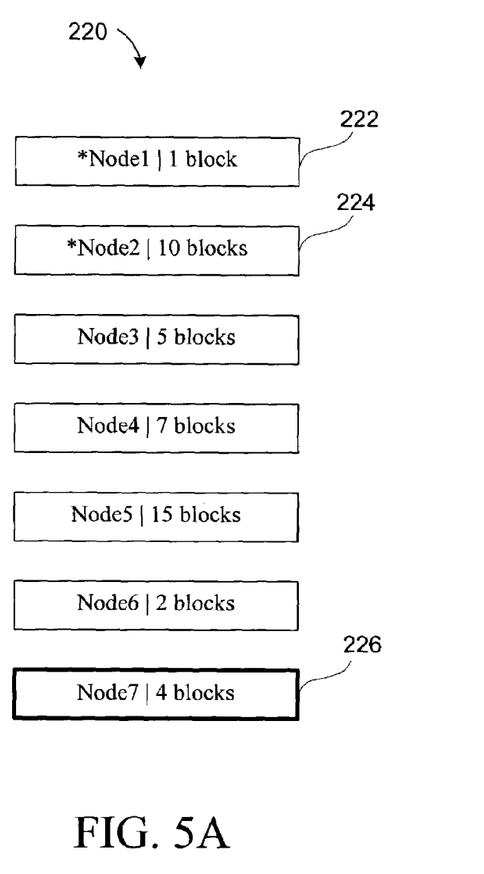
FIG. 5A illustrates a partial database list in accordance with one embodiment of the present invention.
Figure 5B:
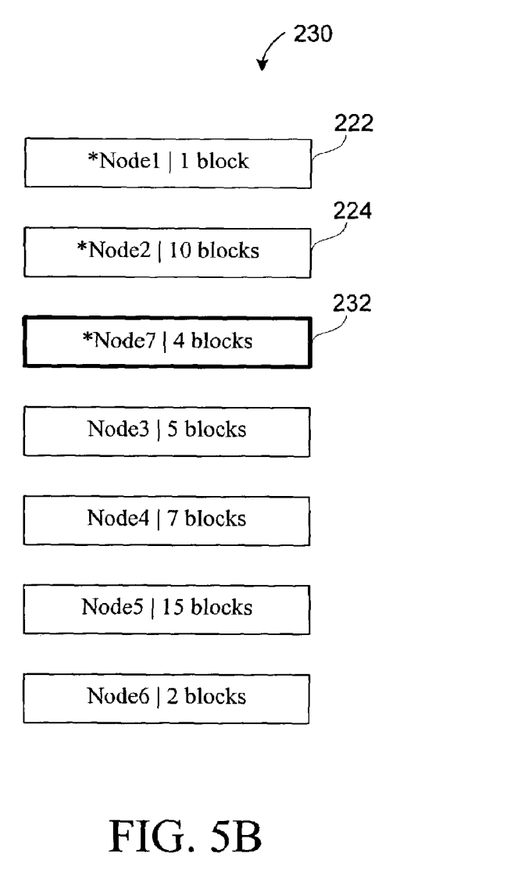
FIG. 5B illustrates the re-sequenced partial database list in accordance with an embodiment of the invention.

FIGS. 5A and 5B further illustrate an embodiment of the present invention in which files are fixed in a particular location. FIG. 5A illustrates a partial database list 220 in accordance with one embodiment of the present invention. The partial database list 220 identifies files by node, illustrated for simplicity as nodes 1 through 7, with file size in blocks indicated. In the embodiment illustrated in FIG. 5A, the file identified at node 1, 222, and the file identified at node 2, 224, are both indicated to be fixed in their present locations with an asterisk, "*" preceding the node. In other embodiments, the files can be flagged, marked, or otherwise indicated in any manner as desired to signify a fixed location. In accordance with one embodiment of the invention, the file 226 is selected for fixing in a desired location. In the example of FIGS. 5A and 5B, the selected file 226 will be fixed in a location immediately following node 1, 222, and node 2, 224. With moving and fixing of a location for one or more files enabled as described above, the request to fix a location for any one or more files in the sequential list of files selected for recording to optical media is received as described above in reference to FIG. 4.

FIG. 5B illustrates the re-sequenced partial database list 230 in accordance with an embodiment of the invention. The request to fix in a desired location file 226 received in FIG. 5A has been received and effected. The re-sequenced file 232 in FIG. 5B shows the re-sequenced file 232 identified at node 7 has been fixed in the desired location immediately following node 1, 222, and node 2, 224. The newly positioned and fixed re-sequenced file 232 is indicated as fixed in the illustrated location with an asterisk "*" preceding the node.

Figure 6:
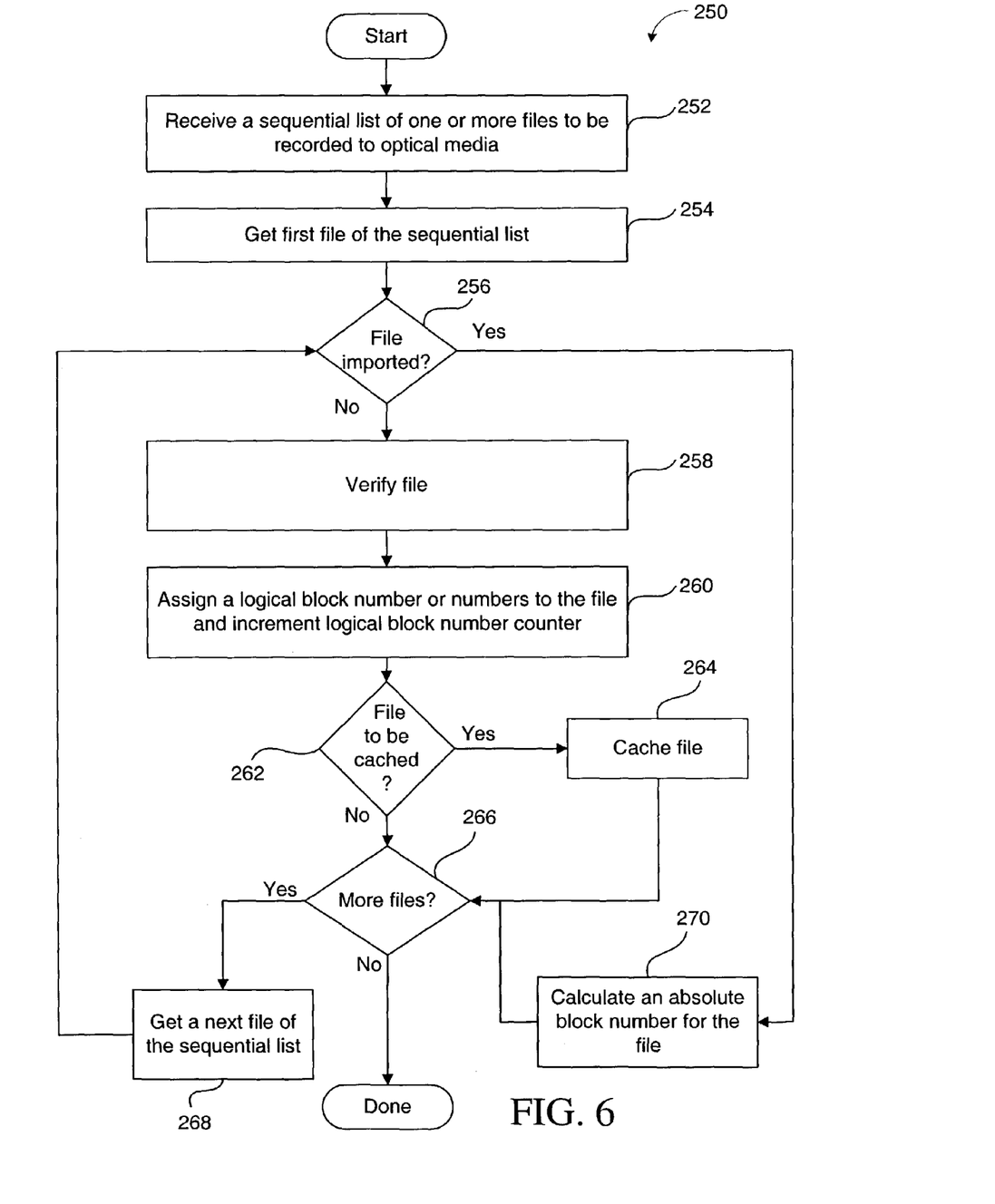
FIG. 6 is a flow chart diagram illustrating the method operations performed during the pre-mastering stage of optical media recording in accordance with one embodiment of the present invention.

FIG. 6 is a flow chart diagram 250 illustrating the method operations performed during the pre-mastering stage of optical media recording in accordance with one embodiment of the present invention. Flow chart diagram 250 illustrates those operations performed, in one embodiment of the invention, just prior to recording the selected one or more files to a destination optical media.

The method begins with operation 252 in which a sequential list of one or more files to be recorded to a target optical media is received. In one embodiment, the sequential list incorporates any track number editing as described above in reference to FIGS. 2 and 3A–3B, and the sequential list incorporates any fixing of a file location as described above in reference to FIGS. 4 and 5A–5B. In other embodiments, additional modifications or edits to the sequential list can be effected after the method operations described below, but the method operations would be repeated prior to the recording of the selected files to the destination optical media.

The method continues with operation 254 in which a first file in the sequential list is obtained, called, or otherwise accessed for examination and processing as described below. The method operations performed in pre-mastering in preparation for recording to optical media are performed for each file in the sequential list of one or more files. In operation 254, a first file is obtained, called, or otherwise accessed, and the following operations will be repeated for each file in the sequential list until all selected files have been processed and readied for recording to optical media.

The method proceeds with decision block 256 in which it is determined whether the file is imported. At this point in flow chart diagram 250, the determination is being made for the first file in the sequential list. As will be described in detail below, the determination is made for each file in the sequential list. For ease of description, the descriptions of the remaining method operations will be discussed in reference to the first file, but it is to be understood that the method operations are applicable to each file processed. In decision block 256, if the file is imported, most of the file processing is not required. As used herein, an imported file is already recorded or written to the target or destination optical media. If the file has not been previously recorded to the target or destination optical media, a "no" to decision block 256, the method proceeds to operation 258.

In operation 258, the file is verified. In one embodiment, verification of a file includes determining the file is located at the source location reported to contain the file, determining the file is of the type indicated, that the file can be accessed in the manner consistent with the type of file indicated, and other such verification processes to ensure file location, size, and integrity.

Once the file has been verified in operation 258, the method continues with operation 260 in which a logical block number or numbers is assigned to the file. Upon assigning the logical block number or numbers, the logical block counter is correspondingly incremented so that the next file, if any, will be assigned to the next or succeeding logical block or blocks. In one embodiment, a logical block counter is maintained for tracking and consecutively assigning files to logical blocks on the target optical media. The logical block counter ensures sufficient media space for selected files, and maps the recording of files to the target or destination optical media.

The method proceeds with decision block 262 in which it is determined whether the file will be cached for the process of recording the file to the target or destination optical media. In prior art caching algorithms, extensive processing resources are dedicated to determining whether a file is sent to cache or read from a source location during the recording process. In one embodiment of the present invention, a simplified caching algorithm is used to determine whether or not a file is cached. In other embodiments, more extensive calculations are used, but in a preferred embodiment, such resources as "burn-proof" optical media recording devices are exploited to maximize efficient use of available resources in recording to optical media. One embodiment of a simplified caching algorithm includes caching any file that is not at a source location that is the local hard drive of the system performing the method operations described herein. For all other files, in one embodiment, a window size is set and used to examine a moving series of files. By way of example, a window of 256 kB (kilobytes) is used to examine a series of 16 files. If the cumulative file size of the sixteen files is less than the window size, 256 kB in this example, then the sixteenth file is cached. The window is then moved by one file, and again the cumulative file size compared to the window size until all selected files have been evaluated. In the exemplary algorithm, by way of example, if a majority of the resident files are fairly large files, e.g., 256 kB or larger, then a majority of the resident files will not be cached in the recording process. The algorithm described is exemplary, and any manner of evaluating the selected files in consideration of system capacity and resource can be used to determine caching requirements.

In decision block 262, if a file is to be cached, a "yes" to decision block 262, the method proceeds to operation 264 and the file is cached. Following the caching of the file in operation 264, the method continues to decision block 266 as described below. In decision block 266, if a file is not to be cached, a "no" to decision block 262, the method proceeds to decision block 266.

In one embodiment of the invention, decision block 266 determines whether more files have been selected and remain to be processed in the pre-mastering process. Decision block 266 sets up the loop to process each file selected to be recorded to a target or destination optical media. If more files remain to be processed, a "yes" to decision block 266, the method loops through operation 268 in which a next file in the sequential list of files is obtained, and back to decision block 256 in which it is determined whether the file is imported.

As described above, imported files, in one embodiment of the invention, require less file processing than non-imported files. If a file is imported, that is, if a file is already recorded to the target or destination optical media, a "yes" to decision block 256, the method proceeds to operation 270 in which an absolute block number is calculated for the file. In one embodiment of the invention, multi-session target or destination optical media can be recorded. Because logical block numbers are generally session-relative, in order to generate a file system entry that points to the imported file on the optical media in a session other than the one being recorded for the selected files, an absolute block number for the location of the file on the optical media is calculated. In operation 270, the absolute block number for the location of the imported file on the target or destination optical media is calculated. In other embodiments (not illustrated in FIG. 6), a plurality of options are presented with respect to imported files. By way of example, a prompt or query may be provided to determine whether it is desired to record a duplicate copy of a selected file to the destination optical media, or to replace a previously recorded file. Generally, if an imported file is selected for recording, and the imported file is to be used as the selection, the file size, attributes, and location are known, accessible, and minimal processing is required.

The method then continues with decision block 266 to determine whether more files remain in the sequential list of one or more files to be recorded to optical media in order to process all files in the list as already described. Once all of the files in the sequential list of one or more files to be recorded to optical media have been processed as described, a "no" to decision block 266, the method is done.

With the embodiments described herein in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, DVD-ROM, DVD-R/RW, DVD-RAM, DVD+R/+RW, magnetic tapes, and other optical data storage devices. The computer readable media can also be distributed over network coupled computer systems so that the computer readable code is stored and executed in a distributed fashion.

In summary, the present invention provides . . . . The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for recording data files to optical media, comprising:
   receiving a request to write a selection of data files to an optical media;
   generating a file node for each file in the selection of data files, wherein the file node is used to retrieve the each file in a single step from root to file avoiding tracing the each file back through any intermediate sub-directories;
   constructing a database for the selection of data files, the database being configured to list each file in the selection of data files to be written to the optical media; and
   writing the selection of data files listed in the database to the optical media,
   wherein the selection of data files listed in the database is arranged in alphabetical order by directory and listed by file node.

2. The method for recording data files to optical media as recited in claim 1, further comprising:
   accessing each file in the selection of data files;
   verifying a source location of each file in the selection of data files;
   determining a file size of each file in the selection of data files; and
   verifying a file integrity of each file in the selection of data files.

3. The method for recording data files to optical media as recited in claim 2, further comprising:
   determining a location for each file in the selection of data files on the optical media; and
   determining whether each file in the selection of data files is sent to system cache.

4. The method for recording data files to optical media as recited in claim 3, wherein the database is configured to list a track number to which each file in the selection of data files is assigned.

5. The method for recording data files to optical media as recited in claim 3, further comprising enabling the editing of a track to which each file in the selection of data files is assigned.

6. The method for recording data files to optical media as recited in claim 3, wherein the database is configured to list a size in blocks of each file in the selection of data files.

7. The method for recording data files to optical media as recited in claim 3, wherein the data files listed in the database are arranged in a sequence in which the data files will be recorded to the optical media.

8. The method for recording data files to optical media as recited in claim 7, further comprising:
enabling moving each file within the sequence to create a new sequence; and
enabling fixing of a location for each file within the sequence and the new sequence.

9. A method for pre-mastering in preparation for recording data files to optical media, comprising:
receiving a selection of data files to be recorded to an optical media;
generating a database in which to list the selection of data files;
populating the database with the selection of data files, the data files being identified by file nodes and listed in alphabetical order by directory, wherein the file nodes are used to retrieve the files in a single step from root to file avoiding tracing the files back through any intermediate sub-directories;
accessing a file in the database;
verifying a source location of the accessed file;
verifying an integrity of the accessed file; and
determining a destination location for the accessed file,
wherein the determining of the destination location for the accessed file includes determining a logical block to which at least a portion of the accessed file is to be recorded on the optical media.

10. The method of claim 9, wherein the database is configured to list a size in blocks of each file in the selection of data files.

11. The method of claim 9, wherein the database is configured to list an assigned track to which each file in the selection of data files is to be written.

12. The method of claim 11 wherein the database is configured to enable editing of the assigned track to which each file in the selection of data files is to be written.

13. The method of claim 9, wherein the database is configured to list the selection of data files in an order in which the selection of data files is to be recorded to optical media.

14. The method of claim 13, wherein the database is configured to enable moving a data file within the order in which the selection of data files is to be recorded to optical media to create a new order.

15. The method of claim 14, wherein the database is configured to enable fixing of a location of data file within the order and within the new order.

16. Computer readable data storage media having program instructions for recording data files to optical media, the computer readable data storage media comprising:
program instructions for receiving a selection of data files to be recorded to optical media;
program instructions for populating a database with a file node for each file in the selection of data files to be recorded to optical media, wherein the file node is used to retrieve the each file in a single step from root to file avoiding tracing the each file back through any intermediate sub-directories;
program instructions for accessing each file in the database;
program instructions for verifying each file in the database;
program instructions for performing a caching algorithm to evaluate each file in the selection of data files;
program instructions for determining a location on the optical media where each file in the selection of data files shall be recorded; and
program instructions for recording the selection of data files to the optical media,
wherein the database is populated with the selection of data files sequenced in alphabetical order by directory.

17. The computer readable data storage media of claim 16, further comprising program instructions for enabling editing of track numbers to which any file in the selection of data files is assigned.

18. The computer readable data storage media of claim 16, further comprising program instructions for enabling fixing a location of any file in the selection of data files within a writing order of the selection of data files.

19. The computer readable data storage media of claim 16, wherein the determining the location on the optical media where each file in the selection of data files shall be recorded includes determining a logical block to which at least a portion of each file in the selection of data files is to be recorded on the optical media.

20. The computer readable data storage media of claim 16, wherein the database lists the selection of data files in an order in which the selection of data files is to be recorded to optical media, the database further enabling moving any data file within the order in which the selection of data files is to be recorded to optical media to create a new order.

* * * * *